US009081796B2

(12) United States Patent
Kiraly

(10) Patent No.: US 9,081,796 B2
(45) Date of Patent: Jul. 14, 2015

(54) METHODS AND APPARATUSES FOR PROVIDING AND DISPLAYING CLUSTER DATA

(71) Applicant: Raytheon Company, Waltham, MA (US)

(72) Inventor: David A. Kiraly, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 368 days.

(21) Appl. No.: 13/737,673

(22) Filed: Jan. 9, 2013

(65) Prior Publication Data
US 2014/0195535 A1    Jul. 10, 2014

(51) Int. Cl.
*G06F 17/30* (2006.01)
*G09B 29/00* (2006.01)
*G09B 29/10* (2006.01)
*H04L 29/08* (2006.01)

(52) U.S. Cl.
CPC ........ *G06F 17/30241* (2013.01); *G09B 29/007* (2013.01); *G06F 17/3087* (2013.01); *G09B 29/10* (2013.01); *H04L 67/10* (2013.01)

(58) Field of Classification Search
CPC .......... G06F 17/30241; G06F 17/3087; G09B 29/10; H04L 67/10
USPC .......... 707/737, 805; 715/200, 700; 709/201, 709/203; 345/619
See application file for complete search history.

(56) References Cited

U.S. PATENT DOCUMENTS

| 6,252,605 | B1 | 6/2001 | Beesley et al. |
| 8,359,324 | B2 * | 1/2013 | Iwamura et al. ............... 707/758 |
| 8,487,957 | B1 * | 7/2013 | Bailly et al. .................... 345/619 |
| 8,565,514 | B2 * | 10/2013 | Rohlf et al. ..................... 382/154 |
| 8,774,825 | B2 * | 7/2014 | Forstall et al. .............. 455/456.1 |
| 8,938,211 | B2 * | 1/2015 | Das et al. ..................... 455/404.2 |
| 2011/0213583 | A1 | 9/2011 | Mao et al. |

FOREIGN PATENT DOCUMENTS

| EP | 2325606 A2 | 5/2011 |
| WO | WO-2014/110038 A2 | 7/2014 |

OTHER PUBLICATIONS

"International Application Serial No. PCT/US2014/010506, International Search Report mailed Jul. 4, 2014", 4 pgs.
"International Application Serial No. PCT/US2014/010506, Written Opinion mailed Jul. 4, 2014", 5 pgs.

(Continued)

*Primary Examiner* — Cheryl Lewis
(74) *Attorney, Agent, or Firm* — Schwegman Lundberg & Woessner, P.A.

(57) ABSTRACT

Embodiments of a method and apparatus for providing cluster data are generally described herein. In some embodiments, the method includes receiving, from a geographic information system (GIS) client device, geographical coordinates of a viewable extent of the GIS client device. The method may include dividing the viewable extent into portions. The method may include receiving geographically-referenced data points. The method may include determining the portions of the viewable extent in which the data points are located. The method may include transmitting, to the GIS client device, clustering information for the portions. The clustering information may be generated based on the data points determined to be within the portions. Other embodiments are also described.

26 Claims, 8 Drawing Sheets

(56) References Cited

OTHER PUBLICATIONS

Burghardt, D., et al., "Automatische Generalisierung dynamisch generierter Karten für mobile Endgeräte", (w/ English Abstract). [online]. [retrieved on Jun. 24, 2014]. Retrieved from the Internet:<URL:https ://web.archive.org/web/20060601030909/http://www.geo.uni zh.ch/"burg/1i terat ur/webpark__kn2005.pdf>, (2006), 6-10.

Karnick, P, et al., "Route Visualization Using Detail Lenses", *IEEE Transactions on Visualization and Computer Graphics*, 16(2), (2010), 235-247.

Komzak, J, et al., "Scaleable GIS Data Transmission and Visualisation", *Proceedings of the Seventh International Conference on Information Visualizatin* (IV '03), (2003), 230-236.

Pombinho, P., et al., "Evaluation of Overcluttering Prevention Techniques for Mobile Devices", *2009 13th International Conference Information Visualisation*, (2009), 127-134.

\* cited by examiner

METHODS AND APPARATUSES FOR PROVIDING AND DISPLAYING CLUSTER DATA

GOVERNMENT RIGHTS

This invention was not made with United States Government support. The United States Government does not have certain rights in this invention.

TECHNICAL FIELD

Some embodiments relate to providing clustering information for geographically-referenced data. Some embodiments relate to displaying clusters of geographically-referenced data. Some embodiments relate to throttling bandwidth use in providing cluster data.

BACKGROUND

Geographical information systems (GISs) may deal with large quantities of data. When all available information is displayed, the user interface of the GIS may become cluttered. Nevertheless, if only some of the available information is displayed, security risks may be introduced in GISs used for surveillance or other applications. Some GISs may display clusters, rather than individual points, of data. However, these GISs may still receive and process large quantities of data in order to implement clustering algorithms on the data. Further, clustering graphics may overlap each other or otherwise become difficult to discern, leading to possible user confusion.

Thus, there are general needs for algorithms to reduce the amount of data transmitted to and processed by a GIS system, while retaining situational awareness capabilities.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some geographic information systems (GISs) may concurrently display hundreds or even thousands of geographically-referenced data points. For example, a GIS used in air traffic systems may display tracking data for hundreds of aircraft, and this may be confusing or overwhelming for operators. Further, as data changes, graphics rendering may take a large amount of time.

Some GISs may display cluster graphics that represent multiple geographically-referenced data points, rather than displaying these multiple data points individually. The cluster graphics may include a notation or other information to let an operator know the amount of data contained within that cluster. Clustering data may also reduce processing time for rendering graphics on user displays.

Nevertheless, a GIS implementing a clustering algorithm may receive large amounts of data, causing cluster processing to become overburdened or sluggish. Further, some conventional clustering algorithms rely on static input data. The operator must therefore manually refresh the user interface to display updated clustering graphics. This can be cumbersome to the operator. This may also add burdens to the system as clustering algorithms must re-process or re-cluster the data with each operator refresh. Some other clustering algorithms may result in a cluttered or confusing user display, as clustering graphics may overlap each other.

Example embodiments may offload cluster processing from the GIS. Example embodiments may provide an algorithm that receives input data from a data provider and provides clustering data to the GIS. Example embodiments may provide clustering information to the GIS, and example embodiments may dynamically handle input data so that the operator does not manually refresh the GIS display. Example embodiments may divide the viewable extent of a user interface into a grid. Example embodiments may place at most one cluster graphic within each portion of a grid. Therefore, cluster graphics will not overlap and the user interface will not become confusingly cluttered.

Example embodiments may further limit or reduce the bandwidth used for transmitting data to the GIS display by throttling data updates while still maintaining situational awareness capabilities.

Figure 1:
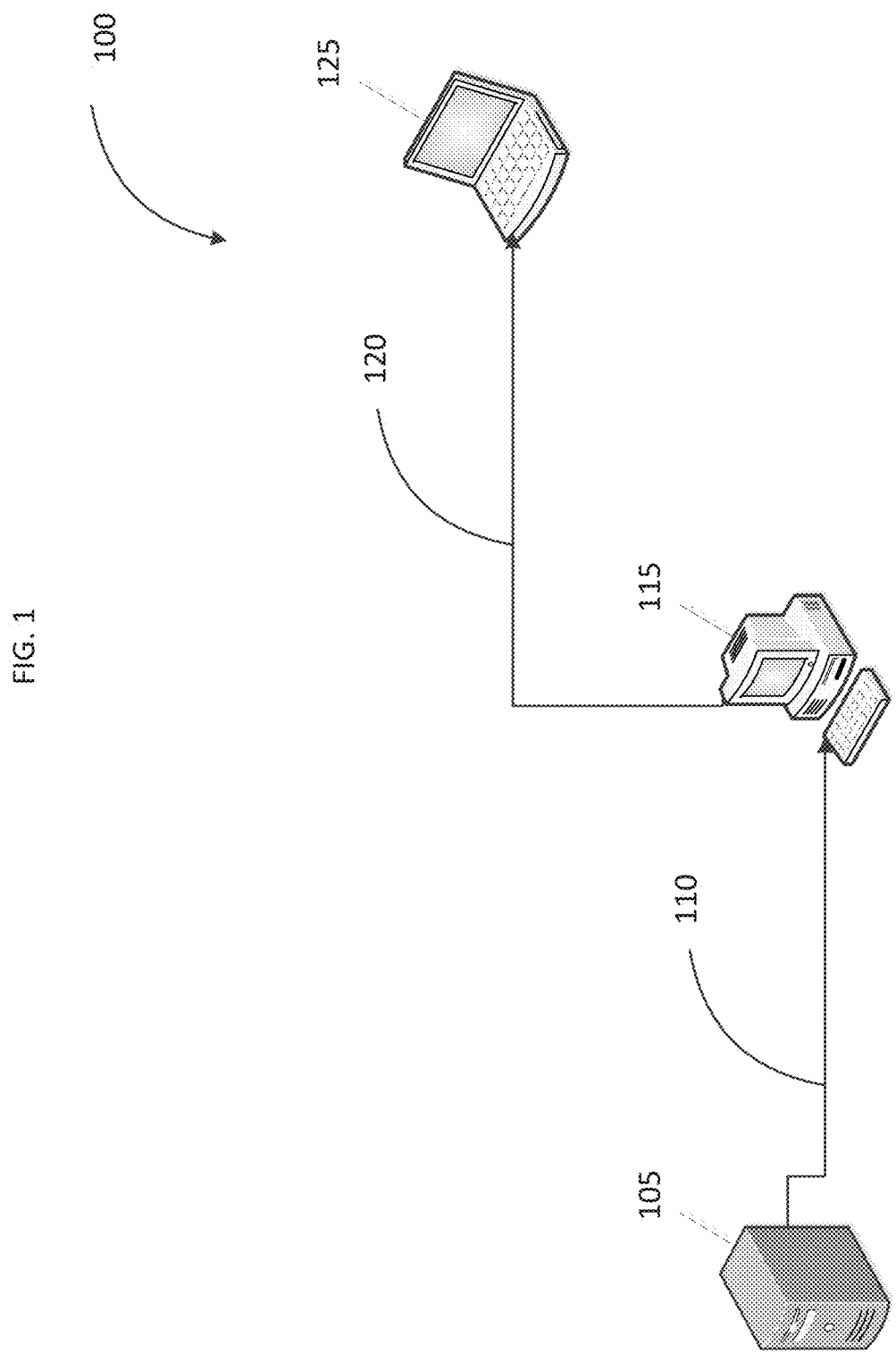
FIG. 1 is a system in accordance with some embodiments.

FIG. 1 is a system 100 in which example embodiments may be implemented. The system 100 includes a server 105 for receiving geographically-referenced data points. The server 105 may input the geographically-referenced data points to a second computer or device 115 using one or more connections 110. The connection 110 may be, for example, a WiFi connection, Ethernet connection, etc. The device 115 may implement algorithms, described below, for clustering data. The server 105 may alternatively or additionally implement the clustering algorithms described below.

The device 115 may transmit clustering information to a GIS 125 over a connection 120. The connection 120 may be, for example, a WiFi connection, Ethernet connection, etc. The GIS 225 may be a Joint Mapping Toolkit (JMTK), ArcGIS for Flex, Google Maps, Google Earth, OpenMap, FalconView etc. The GIS 225 may include functionality to translate messages received from the device 115. The GIS 225 may include functionality for displaying information regarding messages received from the device 115, as described in further detail below.

Figure 2:
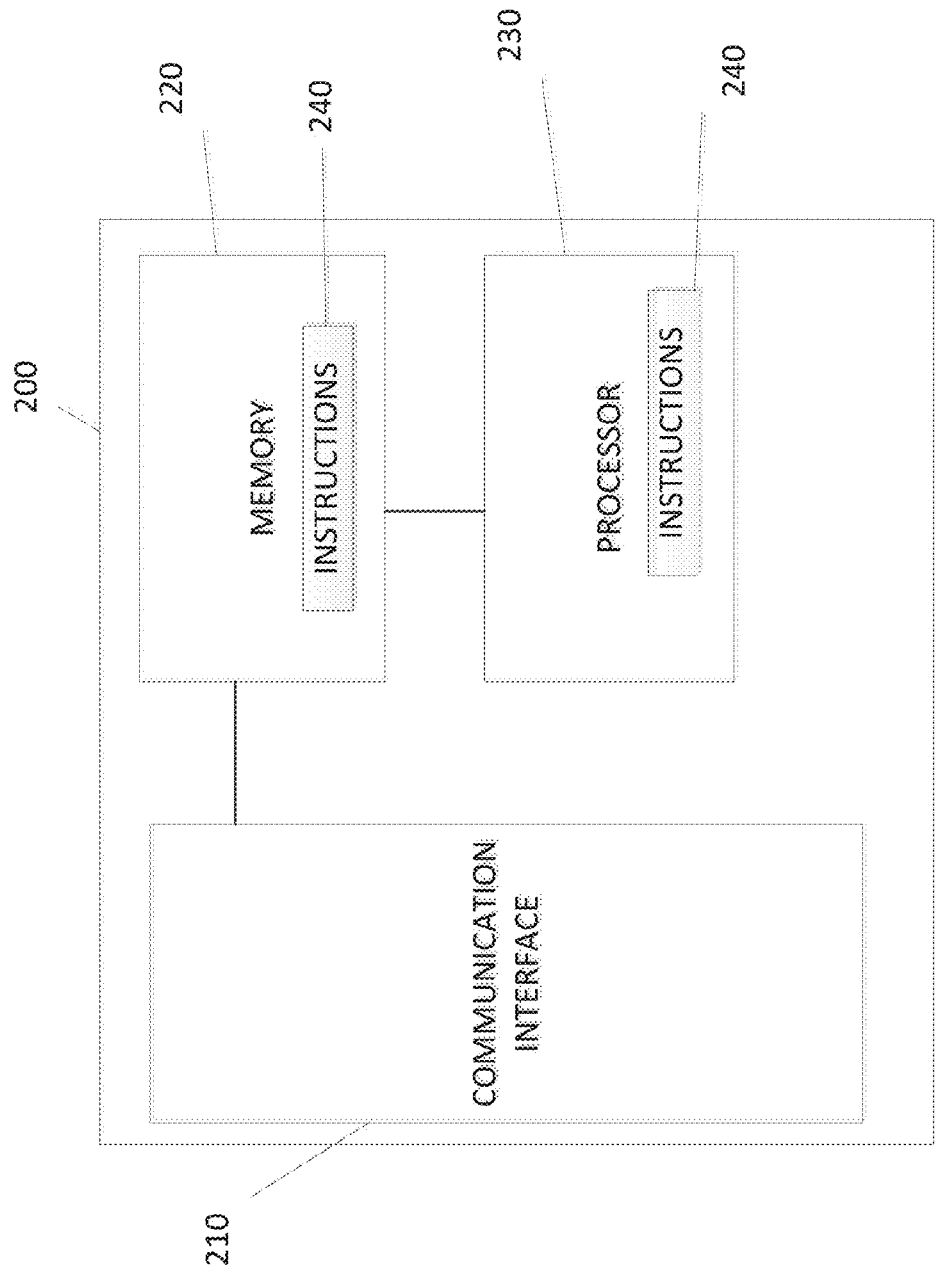
FIG. 2 is a block diagram of a system for implementing procedures in accordance with some embodiments.

FIG. 2 is a block diagram of a computer 200 for implementing methods according to example embodiments. The computer 200 may be appropriate for performing the functionalities of the device 115 (FIG. 1). The computer 200 may be appropriate for providing, for example, clustering of geographically-referenced data points and throttling bandwidth requirements for clustering data transmission.

The computer 200 may include a communication interface 210. The communication interface 210 may receive, for example, data points from the server 105 (FIG. 1). The data points may be geographically-referenced data points representing objects geographically located within or outside the current view of the GIS client device 125 (FIG. 1). The data received from the server 105 may be, for example, airport radar data or national border control data.

The data may comprise data entities, and the data entities may be stored in a memory 220. In one embodiment, the memory 220 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data. The computer 200 may include computer instructions 240 that, when implemented on the computer 200, cause the computer 200 to implement functionality in accordance with example embodiments. The instructions 240 may be stored on a computer-readable storage device, which may be read and executed by at least one processor 230 to perform the operations described herein. In some embodiments, the instructions 240 are stored on the processor 230 or the memory 220 such that the processor 230 or the memory 220 act as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The communication interface 210 may further be arranged to receive, from a GIS client device 125 (FIG. 1), geographical coordinates of a viewable extent of the GIS client device 125. The geographical coordinates of the viewable extent may include a geographical latitude and a geographical longitude of at least one point of a current view displayed on the GIS client device 125. The point may be, for example, the lowermost leftmost point of the current view displayed on the GIS client device 125. The GIS client device 125 may further report an upper right corner for the display, or another corner of the display. The GIS client device 125 may further report a height and width for the display (in pixel units) and the GIS client device 125 may report whether the GIS client device 125 is enabled to receive dynamic cluster data in accordance with embodiments.

The communication interface 210 may receive a threshold value from the GIS client device 125. The threshold value may indicate a number of data points, in each portion, above which data point updates are not to be transmitted to the GIS client device 125. The threshold value may be used for throttling the amount of data transmitted to the GIS client device 125, as described in more detail below.

The processor 230 may divide the viewable extent into portions. For example, the processor 230 may divide the viewable extent into a grid of squares, or portions, with widths and heights of a certain number of pixels.

The processor 230 may determine the portions of the viewable extent in which received data points are located. The processor 230 may determine the portion of the viewable extent to which each of the data points belongs based on the geographic latitude and the geographic longitude of each of the data points. For example, the processor 230 may use the x component (geographic latitude) of a data point and the processor 230 may subtract the lower left latitude point of the current view. The processor 230 may divide the result by a grid portion height, e.g., 70 pixels, and the processor 230 may floor this value as shown below in Equation (1):

$$keyX = \text{Math.floor}((\text{latitude} - \text{lowerLeftLatitude})/\text{portionHeight}) \quad (1)$$

The processor 230 may perform a same or similar calculation on the y component (geographical longitude) of a data point:

$$keyY = \text{Math.floor}((\text{longitude} - \text{lowerLeftLongitude})/\text{portionWidth}) \quad (2)$$

The processor 230 may perform a bit shift and OR operation using the values calculated above in Equations (1)-(2) to create a unique identifier for a portion:

$$\text{identifier} = keyX << 16 | keyY \quad (3)$$

The processor 230 may perform calculations as shown in Equation (1)-(3) for each incoming data point to determine the portion of the viewable extent to which the incoming data point belongs. In this manner, the processor 230 may avoid looping or iterating through the clusters in a current view of the GIS client device 125 to determine the portion to which a data point belongs. Instead, the portion's unique identifier can be determined based on geographical data.

The processor 230 may determine that a received data point is not within the viewable extent of the display on the GIS client device 125. If the received data point is not within the viewable extent, the processor 230 may suppress processing of the received data point.

The processor 230 may generate, for transmission via the communication interface 210, clustering information for the portions. The processor 230 may generate clustering information based on the data points determined to be within the portions.

Upon receiving a data point from the server 105 (FIG. 1), the processor 230 may determine whether the threshold for the portion corresponding to the data point has been exceeded. If the corresponding threshold has not been exceeded, the processor 230 may transmit updated clustering information for the corresponding portion over the communication interface 210.

If the threshold has been exceeded, the processor 230 may suppress transmission of at least one update message for the corresponding portion. For example, if the threshold has currently been exceeded upon receipt of a new data point, the processor 230 the processor 230 may transmit, via the communication interface 210, a message instructing the GIS client device 125 to display a cluster graphic within the portion. The processor 230 may further instruct the GIS client device 125 to terminate display of individual data points within the portion. The cluster graphic may display a value representing a value for the quantity of data points that are within the portion.

The processor 230 may receive further data points, located in a portion, after the threshold has already been exceeded. The processor 230 may receive subsequent indications that data points have moved in or out of a portion. Accordingly, the processor 230 may continue to provide updates for the value for the quantity of data points represented by the cluster graphic. The processor 230 may provide updates periodically. For example, the processor 230 may provide updates every one second. The frequency with which updates are provided may be configurable by, for example, the GIS client device 125.

The processor 230 may suppress transmission of updates of the clustering information for a portion in which the value for the quantity of data points represented by the cluster graphic is unchanged from a previous update.

In an example embodiment, the processor 230 may implement instructions, which may be similar to the illustrative example pseudo code listed below in Tables 1-3, to create, update or delete clusters, respectively. The processor 230 may transmit messages to the GIS client device 125 to create, update, delete, or perform any other operations related to cluster data. The processor 230 may limit the frequency with which these messages are transmitted to the GIS client device 125, thereby throttling bandwidth.

TABLE 1

Pseudo Code for Creating a Cluster

```
1: Receive Geographic Referenced Data Point
2: Id = Determined portion ID for Data Point
3: If there is a cluster for Id
4:      Add Data Point
5:         If cluster exceeds threshold
6:            If just exceeded // current = threshold+ 1
7:               Delete known data from GIS and update count
8:               Add clustered graphic to GIS
9:            Else
10:              Update cluster count
11:        Else If cluster does not exceed threshold
12:           Send create as is to GIS
13: Else If cluster does not exist
14:     Create and Store cluster
15:     Add Data Point
16:     Send create as is to GIS // threshold must be > 1
```

In the illustrative example pseudo code for creating a cluster, in line 1, the processor 230 may receive a new geographically referenced data point from the server 105 (FIG. 1). In line 2, the processor 230 may determine the portion identifier in which the data point is located using, for example, Equations (1)-(3). If there is no cluster in this portion in lines 13-16, the processor 230 will create a cluster and store information regarding this cluster in the memory 220. The processor 230 may further transmit a message to the GIS client device 125 instructing the GIS client device 125 to display a cluster graphic.

If there is a cluster in the portion, in lines 3-12, the processor 230 may add the data point to the cluster. If the threshold count was just exceeded with the addition of the new data point, in line 6-8, the processor 230 may delete previous information and messages regarding the cluster. The processor 230 may instruct the GIS client device 125 to add a new cluster graphic. Otherwise, if the count was not exceeded with the addition of the new data point, the processor 230 may update the count for the cluster in line 10.

TABLE 2

Pseudo-Code for Updating a Cluster

```
1: Receive Geographic Referenced Data Point
2: Id = Determined Cluster ID for Data Point
3:     If there is a cluster for Id
4:        If Data Point contained by cluster
5:           Update Data Point
6:              If cluster exceeds threshold
7:                 // drop message
8:              Else does not exceed threshold
9:                 Send update as is to GIS
10:       Else Data Point not contained
11:          Find/Delete From Old Cluster
12:          Call Create
13: Else there is no cluster for Id
14:       Call Create
```

In the illustrative example pseudo code for updating a cluster, in line 1, the processor 230 may receive a new geographically referenced data point from the server 105 (FIG. 1). In line 2, the processor 230 may determine the portion identifier in which the data point is located using, for example, Equations (1)-(3). If there is no cluster in this portion, in lines 13-14, the processor 230 may invoke code similar to the pseudo code of Table 1 to create a cluster.

If there is a cluster in the portion, in lines 3-12, the processor 230 may determine whether the data point is within a cluster. If the data point is within the cluster, at lines 4-9, the processor 230 may transmit a message to the GIS client device 125 instructing the GIS client device 125 to update the count for that cluster. Further, in lines 6-9, if the cluster exceeds the threshold then there is no need to send the message containing the counts to the GIS client device 125. If the cluster count is not exceeded, the message is sent to the GIS client device 125 and processed. If the data point is not contained within the cluster, the processor 230 may delete the data point from the previous cluster to which the data point belonged in line 11.

TABLE 3

Pseudo-Code for Deleting a Cluster

```
1: Received Geographic Referenced Data Point
2: Id = Determine Cluster ID by Data Point
3: If there is a cluster for Id
4:      Remove Data Point
5:         If cluster is below threshold
6:            If just below threshold
7:               Add new Data to GIS
8:               Remove clustered graphic from GIS
9:            Else
10:              Send Delete to GIS
11:        Else if cluster still exceeds threshold
12:           Update cluster graphics count
13: Else there is no cluster for Id
14:     Send Delete to GIS
```

In the illustrative example pseudo code for deleting a cluster, in line 1, the processor 230 may receive a new geographically referenced data point from the server 105 (FIG. 1). In line 2, the processor 230 may determine the portion identifier in which the data point is located using, for example, Equations (1)-(3). If there is no cluster in this portion in lines 13-14, the processor 230 may transmit a message to the GIS client device 125 instructing the GIS client device 125 to delete any clustering graphic for this cluster.

If there is a cluster in the portion, in lines 3-12, the processor 230 may remove the data point from the cluster. If the cluster count falls below the threshold based on the deleting, the processor 230, in lines 6-8, sends all data that was contained in the cluster so that all the data can be displayed as individual data points on the GIS client device 125. In this manner, an operator may see these data points in real time rather than viewing only a cluster graphic. If the cluster count has not fallen below the threshold based on the deleting, in other words if the count has been under the threshold for some time, then the processor 230, in line 12, transmits a message to the GIS client device 125 instructing the GIS client device 125 to delete the data point from the view.

Figure 3:
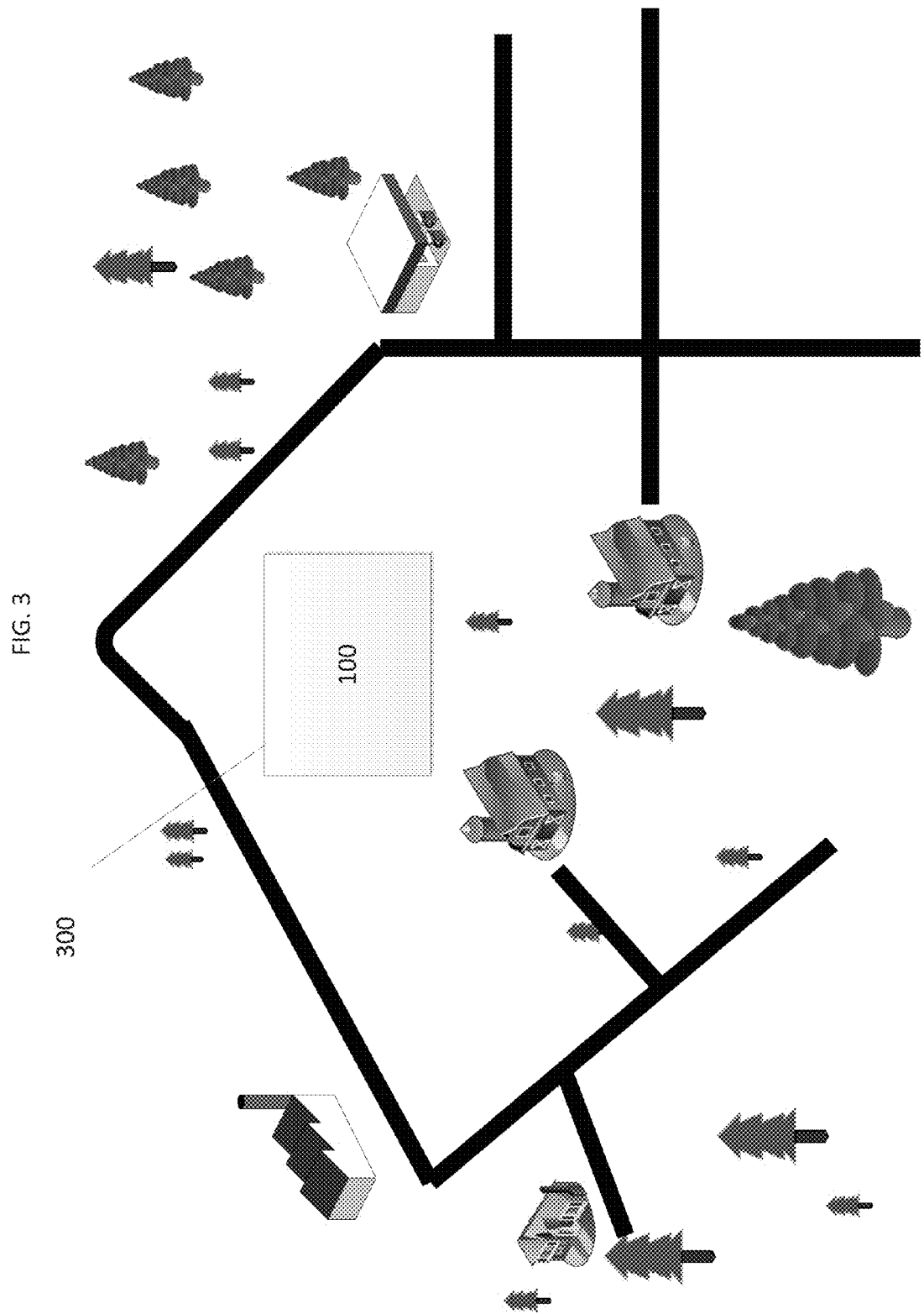
FIG. 3-4 illustrate example clustering data in accordance with some embodiments.
Figure 4:
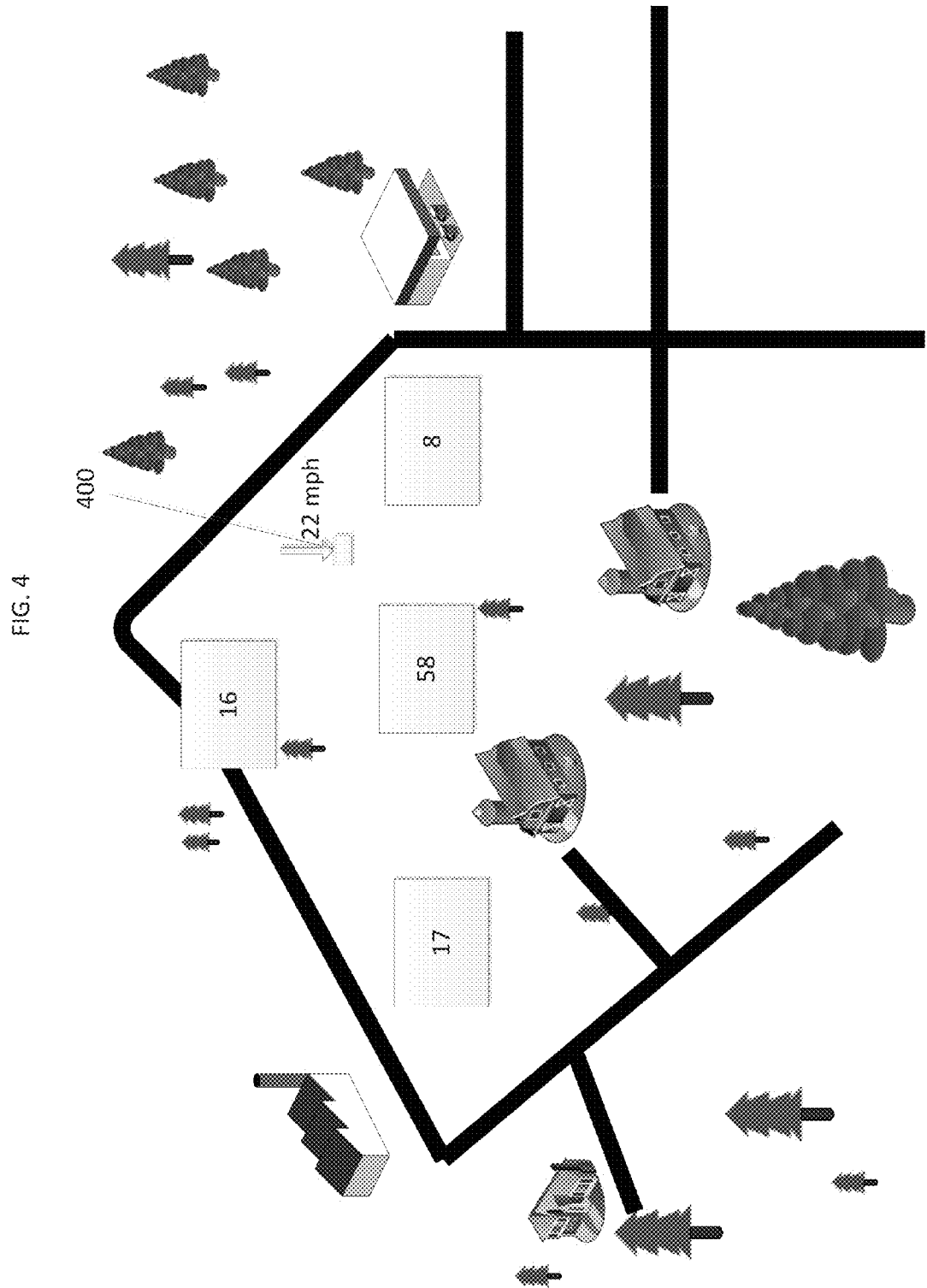

FIG. 3-4 are illustrative examples of clustering in accordance with some embodiments. The illustrative examples may depict clustering displayed on a GIS client device 125. The GIS client device 125 may be, for example, a ClearView GIS.

In FIG. 3, one hundred data points are located in a same clustering box 300. In the illustrative example, an operator may have selected a threshold of five, signifying that when a cluster exceeds a count of five, the GIS client device 125 may replace individual tracks with a cluster graphic 300. The GIS client device 125 may thereafter receive only one message from the device 115 for displaying the cluster graphic.

In FIG. 4, one hundred data points are still depicted on the GIS client device 125, but the data points have moved from the center. The data points are now grouped into new areas. One data point 400 is processed separately because the data point 400 is in a portion that has not exceeded the threshold. The data point 400 therefore is updated in real time. After the four new clusters are processed by the GIS client device 125, the only update received is for the individual data point 400. Nevertheless, situational awareness may be maintained without degrading performance or losing information, because the operator can note that data points have spread out. If one data point 400 breaks away from the rest, this will be depicted on the GIS client device 125. If clusters separate, new smaller clusters may be formed and the operator may note that data points in those clusters are moving apart from each other.

A user of the GIS client device 125 may change the viewable extent of the GIS client device 125. For example, a user may select a cluster graphic to change the viewable extent to include only the portion corresponding to the cluster graphic. The processor 230 may recalculate a grid of portions based on the new viewable extent received from the GIS client device 125. The processor 230 may then send messages instructing the GIS client device 125 to display each data point separately, unless and until data points are close enough to each other to form clusters. Other data points may move into the viewable extent and clustering graphics may be updated accordingly.

Figure 5:
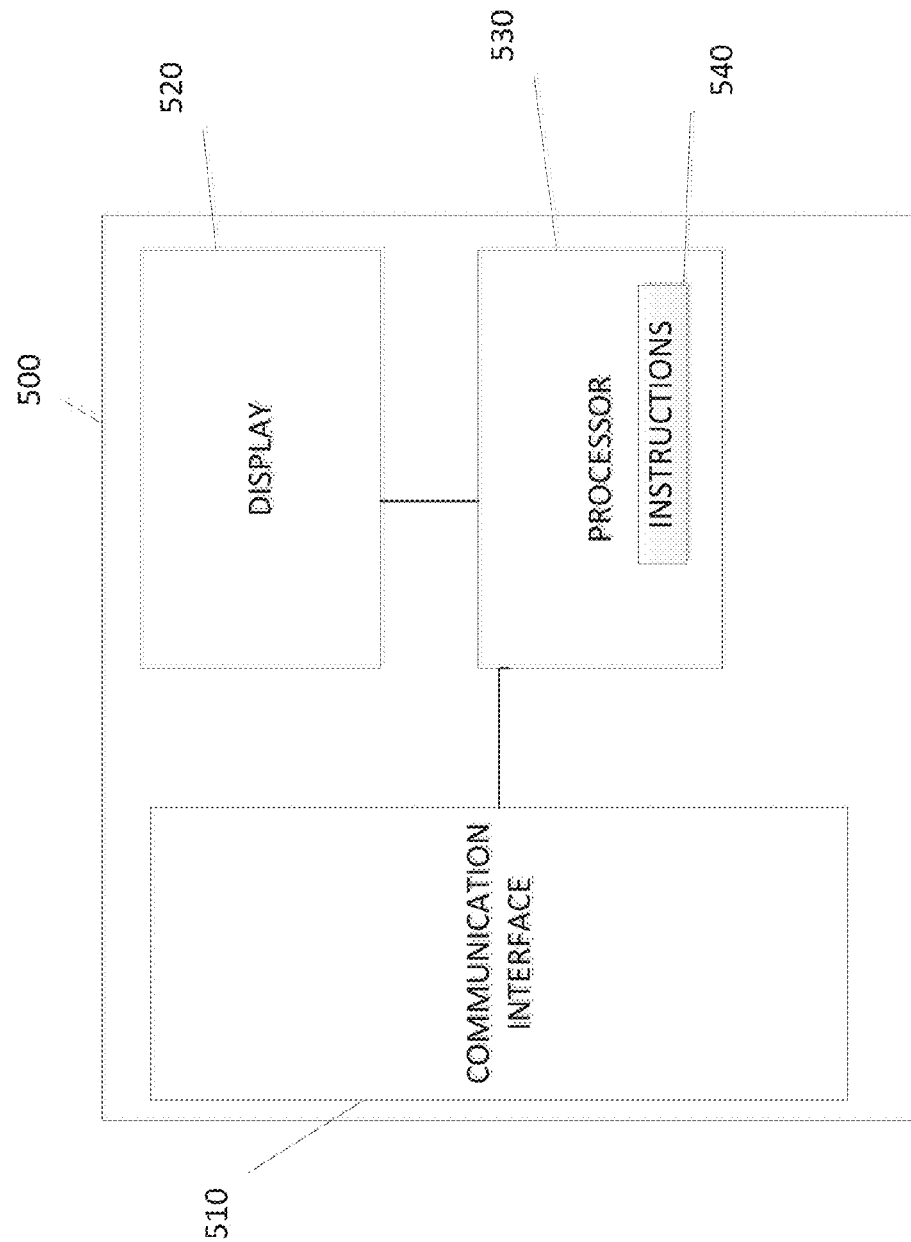
FIG. 5 is a block diagram of a geographic information system (GIS) for implementing procedures in accordance with some embodiments.

FIG. 5 is a block diagram of a computer 500 for implementing methods according to example embodiments. The computer 500 may be appropriate for performing the functionalities of the GIS client device 125 (FIG. 1). The computer 500 may be appropriate for displaying clustering information in accordance with some embodiments.

The computer 500 may include a communication interface 510. The communication interface 510 may transmit coordinates of a viewable extent of the GIS client device 125 to the device 115 (FIG. 1).

The communication interface 510 may receive a clustering data message from the device 115. The clustering data message may include an identifier of a portion of the viewable extent. The clustering data message may further include data representing at least one data point located within the portion.

The computer 500 may further include a display 520. The display 520 may display a graphic representing at least one data point within a corresponding portion.

The computer 500 may further include a processor 530. Embodiments may also be implemented as instructions 540 stored on a computer-readable storage device, which may be read and executed by at least one processor 530 to perform the operations described herein. In some embodiments, the instructions 540 are stored on the processor 530 such that the processor 530 acts as a computer-readable medium. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The communication interface 510 may transmit user preferences to the device 115 (FIG. 1). The user preferences may include a threshold value indicating a number of data points, in each portion, above which data point updates are not to be transmitted to the computer 500. The display 520 may display a graphical representation of each data point in a portion for which the threshold has not been exceeded. The display 520 may display one cluster graphic depicting a value for a quantity of data points in a portion for which the threshold has been exceeded.

Based on an operator changing the viewable extent of the computer 500, the communication interface 510 may transmit revised coordinates of the viewable extent to the device 115.

Figure 6:
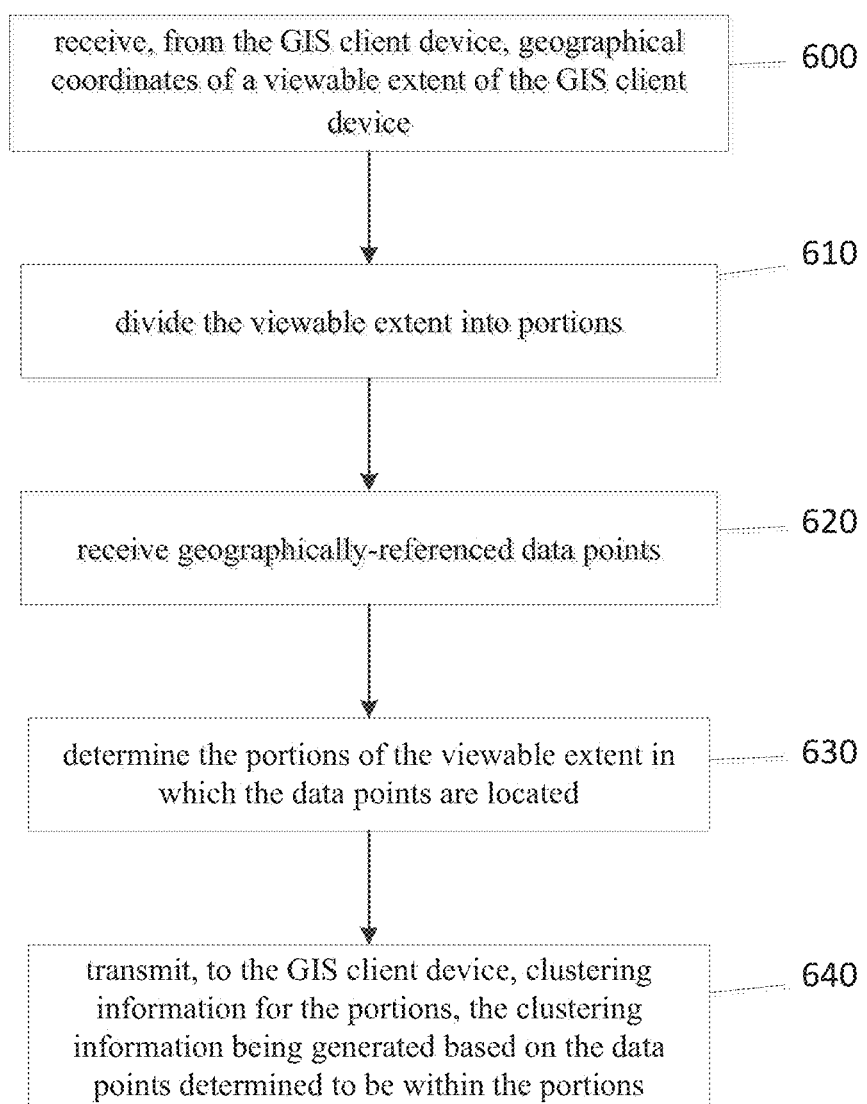
FIG. 6 is a procedure for providing clustering information to a GIS client device in accordance with some embodiments.

FIG. 6 is a flow chart of a method for providing cluster data to a GIS client device 125 (FIG. 1). The method may be performed by, for example, the processor 230 as described above.

In operation 600, the processor 230 may receive, from the GIS client device 125, geographical coordinates of a viewable extent of the GIS client device 125. The geographical coordinates of the viewable extent may include a geographical latitude and a geographical longitude of a point of a current view displayed on the GIS client device 125. The point may be the lowermost leftmost point of the current view displayed on the GIS client device 125. The geographically-referenced data points may represent objects geographically located within the current view on the GIS client device 125.

In operation 610, the processor 230 may divide the viewable extent into portions.

In operation 620, the processor 230 may receive geographically-referenced data points.

In operation 630, the processor 230 may determine the portions of the viewable extent in which the data points are located. The processor 230 may determine the portions based on the geographic latitude and the geographic longitude of the point. The processor 230 may determine that a received data point is not within the current viewable extent of the GIS client device 125. If the processor 230 determines that a received data point is not within the current viewable extent of the GIS client device 125, the processor 230 may suppress cluster processing of that data point.

In operation 640, the processor 230 may transmit, to the GIS client device 125, clustering information for the portions. The processor 230 may generate the clustering information based on the data points determined to be within the portions.

The processor 230 may receive a threshold value from the GIS client device 125. The threshold value may indicate a number of data points, in each portion, above which data point updates are not transmitted to the GIS client device 125. Upon receiving a data point, the processor 230 may determine whether the threshold for the corresponding portion has been exceeded. If the threshold has not been exceeded, the processor 230 may transmit updated clustering information for the portion. If the threshold has been exceeded, the processor 230 may suppress transmission of at least one update message for the portion.

If the threshold value for the corresponding portion has been exceeded upon receiving a data point, the processor 230 may transmit a message instructing the GIS client device 125 to display a cluster graphic within the portion. The GIS client device 125 may therefore terminate display of individual data points within the portion. The cluster graphic may represent a value for a quantity of data points within the portion. The processor 230 may update the value for the quantity of data points represented by the cluster graphic upon receiving subsequent indications that additional data points are located within the portion or upon receiving subsequent indications that data points have moved from the portion.

The processor 230 may suppress transmission of updates of the clustering information for a portion in which the value for the quantity of data points represented by the cluster graphic is unchanged from a previous update. The processor 230 may store data corresponding to received data points and delete the stored data after a time duration.

Figure 7:
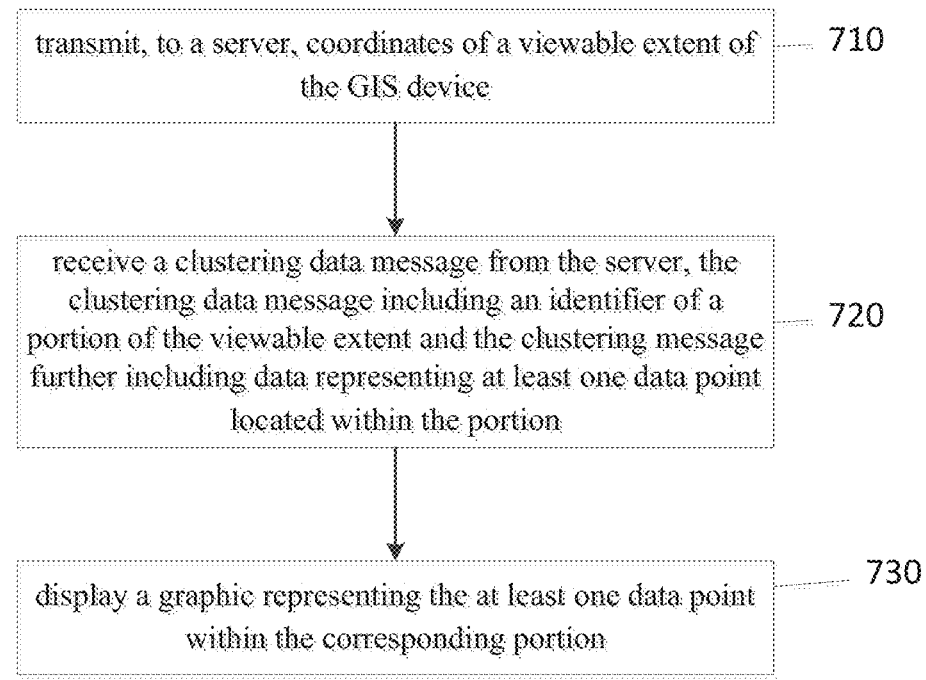
FIG. 7 is a procedure for displaying clusters of geographically-referenced data, in accordance with some embodiments.

FIG. 7 is a flow chart of a method for displaying clusters. The method may be performed by, for example, the GIS client device 125 or the computer 500 as described above.

In operation 710, the GIS client device 125 may transmit, to a device 115 (FIG. 1) coordinates of a viewable extent of the GIS client device 125. The GIS client device 125 may transmit revised coordinates of the viewable extent based on an operator input.

In operation 720, the GIS client device 125 may receive a clustering data message from the device 115. The clustering data message may include an identifier of a portion of the viewable extent. The clustering message may further including data representing at least one data point located within the portion.

In operation 740, the GIS client device 125 may displaying a graphic representing the at least one data point within the corresponding portion.

The GIS client device 125 may transmit user preferences to the device 115. The user preferences may include a threshold value indicating a number of data points, in each portion, above which data point updates are not to be transmitted to the GIS client device 125.

The GIS client device 125 may display a graphical representation of each data point in a portion for which the threshold has not been exceeded. The GIS client device 125 may display one cluster graphic representing a value for a quantity of data points in a portion for which the threshold has been exceeded.

Figure 8:
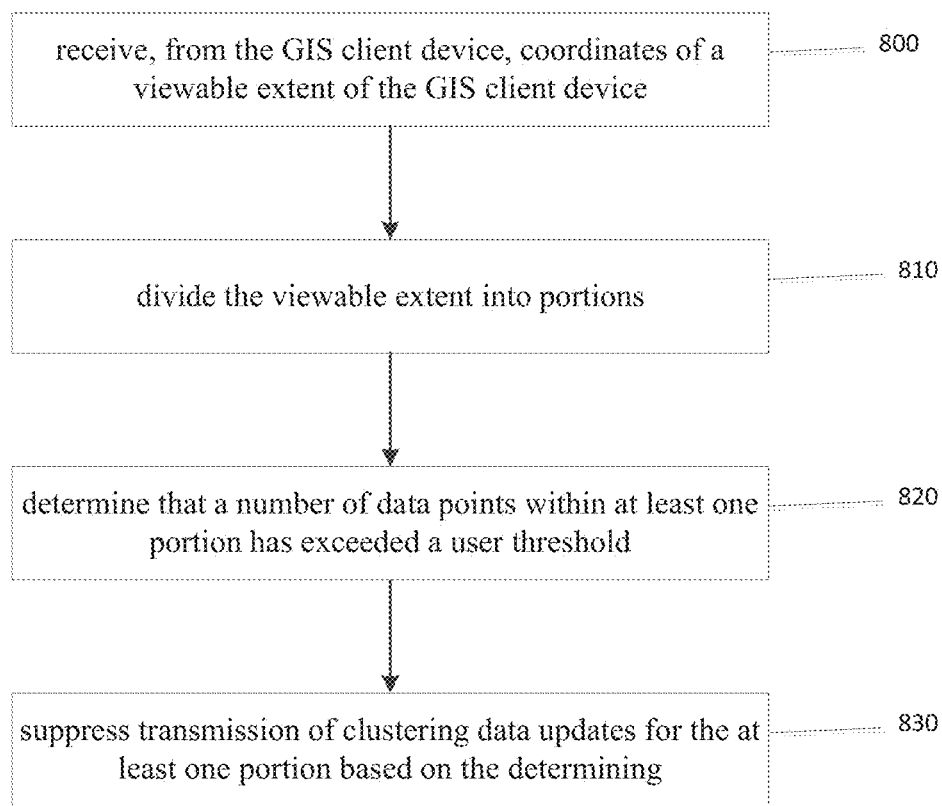
FIG. 8 is a procedure for throttling bandwidth used for cluster data provisioning, in accordance with some embodiments.

FIG. 8 is a flow chart of a method for throttling clustering data updates provided to a GIS client device 125 (FIG. 1). The method may be performed by, for example, the processor 230 as described above.

In operation 800, the processor 230 may receive, from the GIS client device 125, coordinates of a viewable extent of the GIS client device 125.

In operation 810, the processor 230 may divide the viewable extent into portions.

In operation 820, the processor 230 may determine that a number of data points within at least one portion has exceeded a user threshold.

In operation 830, the processor 230 may suppress transmission of clustering data updates for the at least one portion based on the determining. The processor 230 may store the clustering data updates and delete the clustering data updates after a time duration.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for providing cluster data to a geographic information system (GIS) client device, the method comprising:
receiving, from the GIS client device, geographical coordinates of a viewable extent of the GIS client device, wherein the geographical coordinates of the viewable extent include a geographical latitude and a geographical longitude of a point of a current view displayed on the GIS device;
dividing the viewable extent into portions;
receiving geographically-referenced data points, wherein the geographically-referenced data points represent objects geographically located within the current view;
determining the portions of the viewable extent in which the data points are located; and
transmitting, to the GIS client device, clustering information for the portions, the clustering information being generated based on the data points determined to be within the portions.

2. The method of claim 1, further comprising:
receiving a threshold value from the GIS client device, the threshold value indicating a number of data points, in each portion, above which data point updates are not transmitted to the GIS client device.

3. The method of claim 2, further comprising:
upon receiving a data point, determining whether the threshold for the corresponding portion has been exceeded;
if the threshold has not been exceeded, transmitting updated clustering information for the portion; and
if the threshold has been exceeded, suppressing transmission of at least one update message for the portion.

4. The method of claim 3, further comprising:
if the threshold for the corresponding portion has been exceeded upon receiving the data point, transmitting a message instructing the GIS client device to display a cluster graphic within the portion and to terminate display of data points within the portion, the cluster graphic representing a value for a quantity of data points within the portion; and
updating the value for the quantity of data points represented by the cluster graphic upon receiving subsequent indications that additional data points are located within the portion or upon receiving subsequent indications that data points have moved from the portion.

5. The method of claim 4, further comprising:
suppressing transmission of updates of the clustering information for a portion in which the value for the quantity of data points represented by the cluster graphic is unchanged from a previous update.

6. The method of claim 1, wherein the determining is based on the geographic latitude and the geographic longitude of the point.

7. The method of claim 1, further comprising:
determining that a received data point is not within the viewable extent; and
suppressing cluster processing of the received data point based on the determining.

8. The method of claim 7, further comprising:
storing data corresponding to the received data point; and
deleting the stored data after a time duration.

9. The method of claim 1, wherein the point of the current view is the lowermost leftmost point displayed on the GIS device.

10. A method, performed by a geographic information system (GIS) device, for displaying clusters, the method comprising:
transmitting, to a server, coordinates of a viewable extent of the GIS device wherein the coordinates of the viewable extent include a geographical latitude and a geographical longitude of a point of a current view displayed on the GIS device;
receiving a clustering data message from the server, the clustering data message including an identifier of a portion of the viewable extent and the clustering message further including data representing at least one data point located within the portion, wherein the at least one data point represent objects geographically located within the current view; and displaying a graphic representing the at least one data point within the corresponding portion.

11. The method of claim 10, further comprising:
transmitting user preferences to the server, the user preferences including a threshold value indicating a number of data points, in each portion, above which data point updates are not to be transmitted to the GIS client device.

12. The method of claim 11, wherein the displaying comprises:
displaying a graphical representation of each data point in a portion for which the threshold has not been exceeded;
displaying one cluster graphic representing a value for a quantity of data points in a portion for which the threshold has been exceeded.

13. The method of claim 10, further comprising:
transmitting revised coordinates of the viewable extent based on an operator input.

14. A method for throttling clustering data updates provided to a geographic information system (GIS) client device, the method comprising:
receiving, from the GIS client device, coordinates of a viewable extent of the GIS client device, wherein the coordinates of the viewable extent include a geographical latitude and a geographical longitude of a point of a current view displayed on the GIS device;
dividing the viewable extent into portions;
determining that a number of data points within at least one portion has exceeded a user threshold, wherein the data points represent objects geographically located within the current view; and
suppressing transmission of clustering data updates for the at least one portion based on the determining.

15. The method of claim 14, further comprising:
storing the clustering data updates, and
deleting the clustering data updates after a time duration.

16. An apparatus for providing cluster data to a geographic information system (GIS) client device, the apparatus comprising:
a communication interface configured to
receive data points, and
receive, from the GIS client device, geographical coordinates of a viewable extent of the GIS client device, wherein the geographical coordinates of the viewable extent include a geographical latitude and a geographical longitude of a point of a current view displayed on the GIS device, and wherein the data points represent objects geographically located within the current view; and
one or more processors configured to
divide the viewable extent into portions;
determine the portions of the viewable extent in which received data points are located; and
generate, for transmission via the communication interface, clustering information for the portions, the clustering information being generated based on the data points determined to be within the portions.

17. The apparatus of claim 16, wherein the communication interface is further configured to:
receive a threshold value from the GIS client device, the threshold value indicating a number of data points, in each portion, above which data point updates are not transmitted to the GIS client device.

18. The apparatus of claim 17, wherein the one or more processors are further configured to:

upon receiving a data point, determine whether the threshold for the corresponding portion has been exceeded;
if the threshold has not been exceeded, transmit, via the communication interface, updated clustering information for the portion; and
if the threshold has been exceeded,
suppress transmission of at least one update message for the portion,
transmit, via the communication interface, a message instructing the GIS client device to display a cluster graphic within the portion and to terminate display of data points within the portion, the cluster graphic representing a value for a quantity of data points within the portion, and
update the value for the quantity of data points represented by the cluster graphic upon receiving subsequent indications that additional data points are located within the portion or upon receiving subsequent indications that data points have moved from the portion.

19. The apparatus of claim 18, wherein the one or more processors are further configured to:
suppress transmission of updates of the clustering information for a portion in which the value for the quantity of data points represented by the cluster graphic is unchanged from a previous update.

20. The apparatus of claim 18, wherein the one or more processors determine the portion of the viewable extent to which each of the data points belongs based on the geographic latitude and the geographic longitude of each of the data points.

21. The apparatus of claim 16, wherein the one or more processors are further arranged to:
determine that a received data point is not within the viewable extent; and
suppress cluster processing of the received data point based on the determining.

22. The apparatus of claim 16, wherein the point is the lowermost leftmost point of the current view displayed on the GIS device.

23. A computer-readable medium storing instructions that, when executed on a geographic information system (GIS) client device, cause the GIS client device to:
transmit, to a server, coordinates of a viewable extent of the GIS device, wherein the coordinates of the viewable extent include a geographical latitude and a geographical longitude of a point of a current view displayed on the GIS device;
receive a clustering data message from the server, the clustering data message including an identifier of a portion of the viewable extent and the clustering data message further including data representing at least one data point located within the portion, wherein the at least one data point represents objects geographically located within the current view; and
display a graphic representing the at least one data point within the corresponding portion.

24. The computer-readable medium of claim 23, further comprising instructions that, when implemented on a GIS client device, cause the GIS client device to:
transmit user preferences to the server, the user preferences including a threshold value indicating a number of data points, in each portion, above which data point updates are not to be transmitted to the GIS client device.

25. The computer-readable medium of claim 24, further comprising instructions that, when implemented on a GIS client device, cause the GIS client device to:

display a graphical representation of each data point in a portion for which the threshold has not been exceeded;

display one cluster graphic depicting a value for a quantity of data points in a portion for which the threshold has been exceeded.

26. The computer-readable medium of claim 23, further comprising instructions that, when executed on a GIS client device, cause the GIS client device to:

transmit revised coordinates of the viewable extent based on an operator input.

* * * * *

UNITED STATES PATENT AND TRADEMARK OFFICE
CERTIFICATE OF CORRECTION

| | | |
|---|---|---|
| PATENT NO. | : 9,081,796 B2 | Page 1 of 1 |
| APPLICATION NO. | : 13/737673 | |
| DATED | : July 14, 2015 | |
| INVENTOR(S) | : David A. Kiraly | |

It is certified that error appears in the above-identified patent and that said Letters Patent is hereby corrected as shown below:

Specification

In column 2, line 54, delete "225" and insert --125--, therefor

In column 2, line 56, delete "225" and insert --125--, therefor

In column 2, line 58, delete "225" and insert --125--, therefor

In column 9, line 17, delete "740," and insert --730,--, therefor

Signed and Sealed this
Sixteenth Day of February, 2016

Michelle K. Lee
*Director of the United States Patent and Trademark Office*